US012131730B2

(12) United States Patent
Nakamura et al.

(10) Patent No.: US 12,131,730 B2
(45) Date of Patent: Oct. 29, 2024

(54) KEYWORD DETECTION APPARATUS, KEYWORD DETECTION METHOD, AND PROGRAM

(71) Applicant: NIPPON TELEGRAPH AND TELEPHONE CORPORATION, Tokyo (JP)

(72) Inventors: Takashi Nakamura, Tokyo (JP); Tomohiro Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 620 days.

(21) Appl. No.: 17/298,368

(22) PCT Filed: Nov. 19, 2019

(86) PCT No.: PCT/JP2019/045160
§ 371 (c)(1),
(2) Date: May 28, 2021

(87) PCT Pub. No.: WO2020/110815
PCT Pub. Date: Jun. 4, 2020

(65) Prior Publication Data
US 2022/0005466 A1    Jan. 6, 2022

(30) Foreign Application Priority Data
Nov. 30, 2018   (JP) .................................. 2018-224435

(51) Int. Cl.
G10L 15/18      (2013.01)
G10L 15/08      (2006.01)
G10L 15/16      (2006.01)

(52) U.S. Cl.
CPC .............. *G10L 15/18* (2013.01); *G10L 15/16* (2013.01); *G10L 2015/088* (2013.01)

(58) Field of Classification Search
CPC .... G10L 15/18; G10L 15/16; G10L 2015/088
See application file for complete search history.

(56) References Cited

FOREIGN PATENT DOCUMENTS

WO   WO-2018117094 A1 *  6/2018   ........... G06F 40/242

OTHER PUBLICATIONS

Coucke et al., "Snips Voice Platform: an embedded Spoken Language Understanding system for private-by-design voice interfaces," arXiv:1805.10190v2 [cs.CL], Nov. 5, 2018, available at: https://doi.org/10.48550/arXiv.1805.10190. (Year: 2018).*

(Continued)

*Primary Examiner* — Paras D Shah

(57) ABSTRACT

A keyword is extracted robustly despite a voice recognition result including an error. A model storage unit 10 stores a keyword extraction model that accepts word vector representations of a plurality of words as an input and extracts and outputs a word vector representation of a word to be extracted as a keyword. A speech detection unit 11 detects a speech part from a voice signal. A voice recognition unit 12 executes voice recognition on the speech part of the voice signal and outputs a confusion network which is a voice recognition result. A word vector representation generating unit 13 generates a word vector representation including reliability of voice recognition with regard to each candidate word for each confusion set. A keyword extraction unit 14 inputs the word vector representation of the candidate word to the keyword extraction model in descending order of the reliability and obtains the word vector representation of the keyword.

17 Claims, 4 Drawing Sheets

(56) References Cited

OTHER PUBLICATIONS

Machine English translation of Nakamura et al., WO 2018/117094 A1. (Year: 2018).*
Deoras et al., "Iterative decoding: A novel re-scoring framework for confusion networks," 2009 IEEE Workshop on Automatic Speech Recognition & Understanding, Moreno, Italy, 2009, pp. 282-286, doi: 10.1109/ASRU.2009.5373438. (Year: 2009).*
Miller et al., "Rapid and Accurate Spoken Term Detection," Interspeech 2007-174, 4 pages. (Year: 2007).*
Mamou et al., "Spoken document retrieval from call-center conversations," SIGIR '06 conference paper, Aug. 6-10, 2006 Seattle, Washington USA, 9 pages (Year: 2006).*
Zhang et al. (2006) "Keyword Extraction Using Support Vector Machine" Advances in Web-Age Information Management, pp. 85-96.
Zhang et al. (2016) "Keyphrase Extraction Using Deep Recurrent Neural Networks on Twitter" Proceedings of the 2016 Conference on Empirical Methods in Natural Language Processing, pp. 836-845.

* cited by examiner

KEYWORD DETECTION APPARATUS, KEYWORD DETECTION METHOD, AND PROGRAM

CROSS-REFERENCE TO RELATED APPLICATIONS

This application is a U.S. 371 Application of International Patent Application No. PCT/JP2019/045160, filed on 19 Nov. 2019, which application claims priority to and the benefit of JP Application No. 2018-224435, filed on 30 Nov. 2018, the disclosures of which are hereby incorporated herein by reference in their entireties.

TECHNICAL FIELD

The present invention relates to a technology for extracting an important spoken word as a keyword from an input voice signal.

BACKGROUND ART

Various keyword extraction schemes have been proposed in conferences and the like and have become practically used. Non Patent Literature 1 discloses a technology for extracting a keyword based on both global context information and local context information using a support vector machine (SVM). Non Patent Literature 2 discloses a technology for automatically extracting a keyword from text collected from Twitter (registered trademark) using a recurrent neural network (RNN).

CITATION LIST

Non Patent Literature

Non Patent Literature 1: Kuo Zhang, Hui Xu, Jie Tang, Juanzi Li, "Keyword Extraction Using Support Vector Machine". Advances in Web-Age Information Management, WAIM 2006, pp. 85 to 96, 2016.

Non Patent Literature 2: Qi Zhang, Yang Wang, Yeyun Gong, Xuanjing Huang, "Keyphrase Extraction Using Deep Recurrent Neural Networks on Twitter". Proceedings of the 2016 Conference on Empirical Methods in Natural Language Processing, pp. 836 to 845, 2016.

SUMMARY OF THE INVENTION

Technical Problem

In the keyword extraction technologies of the related art, countermeasures for text including errors have not been disclosed. Therefore, for example, when a voice recognition result including an error occurring due to background noise, excessive reverberation, or voice pause or reiteration of a speaker is set as a target and a keyword is extracted, there is concern of an appropriate keyword not being extracted.

An objective of the present invention is to provide a keyword extraction technology capable of extracting a keyword robustly even when a voice recognition result includes an error.

Means for Solving the Problem

To solve the foregoing problem, according to an aspect of the present invention, a keyword extraction device includes; a model storage unit configured to store a keyword extraction model that accepts word vector representations of a plurality of words as an input and extracts and outputs a word vector representation of a word to be extracted as a keyword; a voice recognition unit configured to execute voice recognition on an input voice signal and output a confusion network which is a voice recognition result; a word vector representation generating unit configured to generate a word vector representation including at least reliability of voice recognition with regard to each candidate word included in each confusion set included in the confusion network; and a keyword extraction unit configured to input the word vector representation of the candidate word included in each confusion set to the keyword extraction model in descending order of the reliability and obtain the word vector representation of the word to be extracted as the keyword.

Effects of the Invention

According to the present invention, it is possible to extract a keyword robustly even with a voice recognition result including an error.

DESCRIPTION OF EMBODIMENTS

Figure 1:
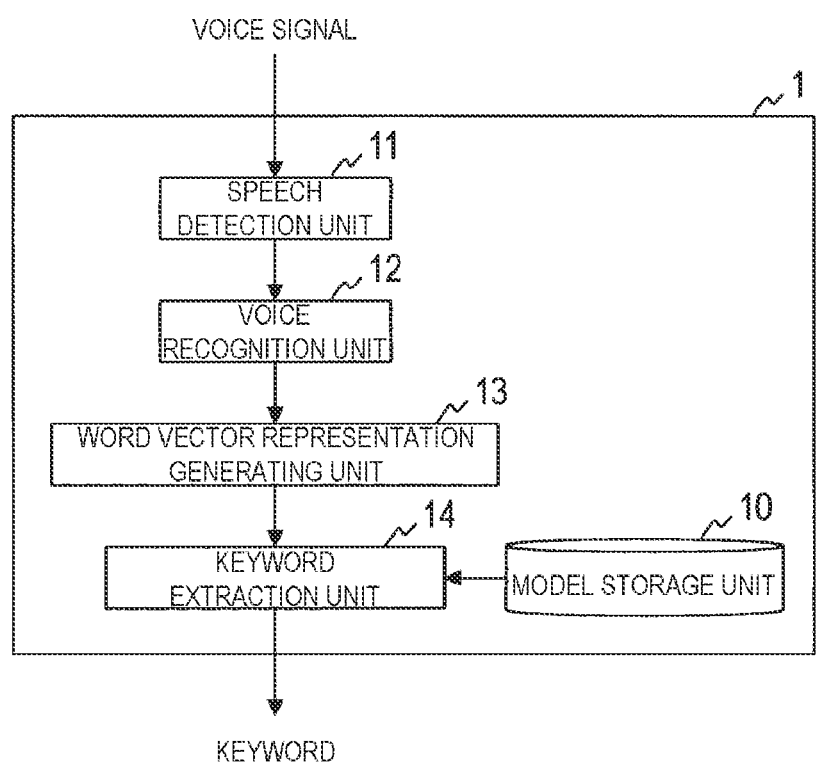
FIG. 1 is a diagram exemplifying a functional configuration of a keyword extraction device.

Hereinafter, an embodiment of the present invention will be described in detail. In the drawings, the same reference numerals are given to constituent units that have the same functions and the repeated description will be omitted.

Figure 2:
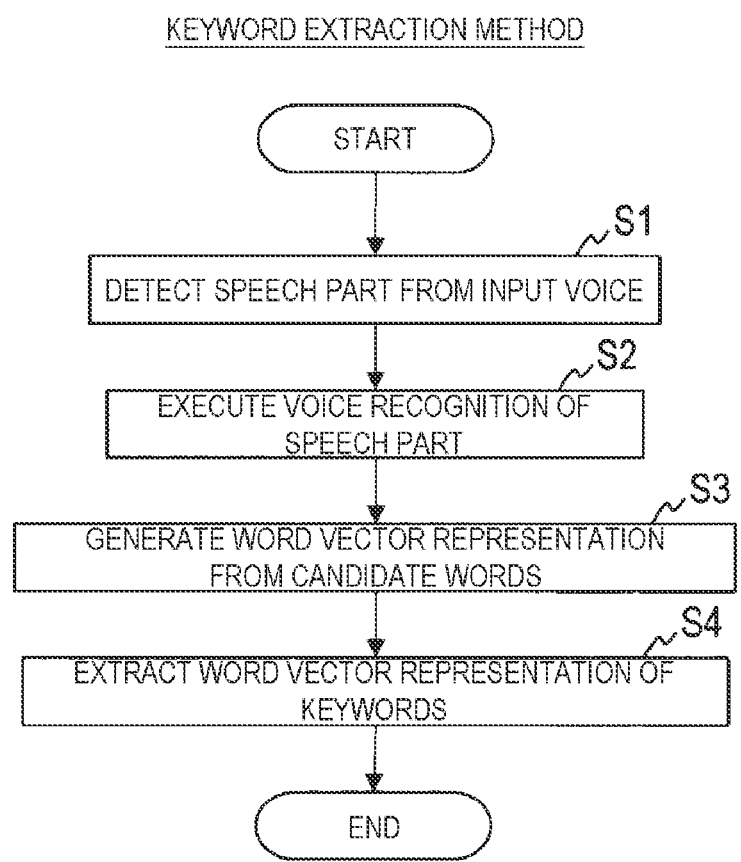
FIG. 2 is a diagram exemplifying a processing order of a keyword extraction method.

An embodiment to be described below provides a keyword extraction device and method capable of extracting and outputting a word vector representation of a word to be extracted as a keyword from a voice recognition result of an input voice signal using a keyword extraction model trained in advance. A keyword extraction device 1 according to the embodiment includes a model storage unit 10, a speech detection unit 11, a voice recognition unit 12, a word vector representation generating unit 13, and a keyword extraction unit 14, as exemplified in FIG. 1. When the keyword extraction device 1 executes processing of each step exemplified in FIG. 2, a keyword extraction method according to the embodiment is realized.

The keyword extraction device 1 is, for example, a special device configured when a special program is read on a known or dedicated computer that includes a central processing unit (CPU) and a random access memory (RAM). For example, the keyword extraction device 1 executes each process under the control of the central processing unit. Data input to the keyword extraction device 1 or data obtained through each process is stored in, for example, a random access memory and the data stored in the random access memory is read on the central processing unit and is used for other processing as necessary. Each functional unit of the keyword extraction device 1 may be at least partially configured by hardware such as an integrated circuit. Each storage unit included in the keyword extraction device 1 can be configured by, for example, a main storage device such as a random access memory (RAM), an auxiliary storage device formed by a semiconductor memory element such as a hard disk, an optical disc, or a flash memory, or a middleware such as a relational database or a key-value store.

The model storage unit 10 stores a keyword extraction model trained in advance. The keyword extraction model accepts word vector representations of a plurality of words as an input and estimates presence or absence of a word to be extracted as a keyword. When there is a word to be extracted as a keyword in word vector representations of a plurality of input words, the keyword extraction model outputs the word vector representation of the keyword. When there is no word to be extracted as a keyword in word vector representations of a plurality of input words, the keyword extraction model outputs a vector equivalent to a state (=null) in which nothing is output as information indicating that there is no word. When there are a plurality of words to be extracted as keywords in word vector representations of a plurality of input words, the keyword extraction model outputs a word vector representation set which is formed from a word vector representation of the plurality of keywords.

The keyword extraction model is, for example, a deep neural network (DNN) configured using a time-series statistical model or the like capable of ascertaining (handling) a long-distance context such as a long short-term memory (LSTM). The keyword extraction model is trained according to a training procedure of a general deep neural network based on training data including a large amount of voice data and a correct answer value of a keyword is associated with each piece of voice data are paired.

In step S1, the speech detection unit 11 receives a voice signal input to the keyword extraction device 1. The speech detection unit 11 detects a speech part from the received voice signal. The speech detection unit 11 inputs information regarding the detected speech part to the voice recognition unit 12. The information regarding the speech part is specifically a voice waveform of the detected speech part, a speech start time, a speech end time, a voice power, an SN ratio, and the like.

In the detection of the speech part, a known speech detection technology may be used. Specifically, for example, a speech detection technology described in Reference Document 1 or Reference Document 2 below can be used.
[Reference Document 1] Japanese Patent No. 5740362
[Reference Document 2] Masakiyo Fujimoto and Tomohiro Nakatani, "Feature enhancement based on generative-discriminative hybrid approach with GMMs and DNNs for noise robust speech recognition", in Proceedings of ICASSP '15, pp. 5019 to 5023, April 2015.

In step S2, the voice recognition unit 12 receives the information regarding the speech part from the speech detection unit 11. The voice recognition unit 12 executes voice recognition on a voice waveform of the speech part of the input voice signal and requests a confusion network indicating a voice recognition result. The voice recognition unit 12 inputs the confusion network indicating the voice recognition result to the word vector representation generating unit 13.

Figure 3:
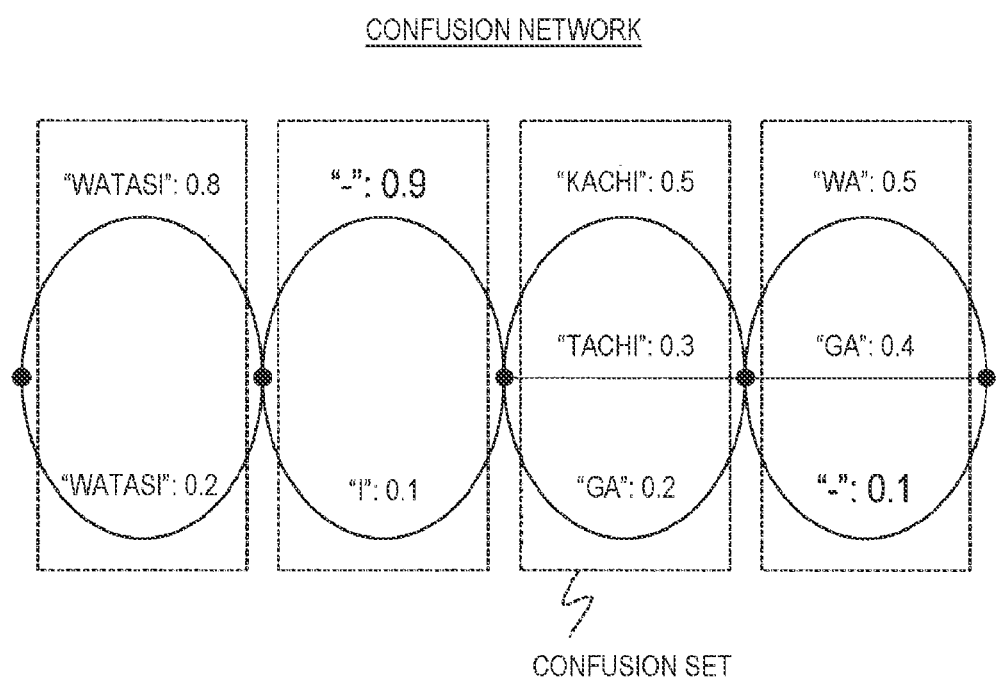
FIG. 3 is a diagram showing a structure of a confusion network.

The confusion network is a compact representation of an N-best list or a word lattice and is a network compressed by acoustically clustering the word lattice. The N-best list is a list of high-order N sentences of a voice recognition result. The word lattice is a combination graph in which candidate words of the voice recognition result can be received. The confusion network has a structure in which a plurality of confusion sets (portions surrounded by dotted lines) continue, as shown in FIG. 3. Each confusion set represents one clustering result when candidate words of the voice recognition result are clustered. Each confusion set includes a plurality of candidate words to which reliability of voice recognition is granted. As a research result of the confusion network, a word considered to be the most appropriate in view of an entire sentence among candidate words in each confusion set is selected as a voice recognition result. A method of generating the confusion network is described in, for example, Reference Document 3 below.
[Reference Document 3] L. Mangu, E. Brill, A. Stolcke, "Finding consensus in speech recognition: word error minimization and other applications of confusion networks", Computer Speech and Language, vol. 14 (4), pp. 373 to 400, October 2000.

In step S3, the word vector representation generating unit 13 receives the confusion network indicating the voice recognition result from the voice recognition unit 12. The word vector representation generating unit 13 generates a word vector representation for all the candidate words included in each confusion set included in the confusion network. The word vector representation generating unit 13 inputs the generated word vector representation of the candidate words to the keyword extraction unit 14.

The word vector representation of a certain candidate word includes a word vector representing the candidate word, a part-of-speech vector representing a part of speech of the candidate word, reliability of voice recognition granted to the candidate word, a confusion set number used to uniquely identify a confusion set including the candidate word, and a confusion set end flag indicating a final word when candidate words of the confusion set including the candidate word are arranged in descending order of the reliability.

The word vector is generated using, for example, a word vector representation generating technology such as word2vec (skip-gram) described in Reference Document 4 below. The part-of-speech vector is generated in, for example, a 1-of-K representation or the like.
[Reference Document 4] T. Mikolov, I. Sutskever, K. Chen, G. S. Corrado, "Distributed Representations of Words and Phrases and their Compositionality", Advances in Neural Information Processing Systems 26 (NIPS 2013), pp. 3111 to 3119, 2013.

The confusion set number is assumed to be normalized in units of confusion networks. The confusion set number is normalized, for example, by granting consecutive numbers which start from 0 and increase by 1 to a plurality of confusion sets included in the confusion network from the first confusion set and dividing the consecutive number by the number of confusion sets included in the confusion network.

In the confusion set end flag, the candidate words included in the confusion set are sorted in descending order of the reliability (from the highest), 1 is set in the final word (that is, the candidate word with the lowest reliability), and 0 in the other words. The confusion set end flag is a flag granted to execute training so that none is output for a word with the end flag 0 and a word vector representation of a keyword is output for a word with the end flag 1 when the keyword extraction model is trained.

The word vector representation generating unit 13 generates a word vector representation for each confusion set included in the confusion network as follows. First, the candidate words included in the confusion set are sorted in descending order of the reliability. Then, the confusion set end flag is set to 0 in the words other than the final word, and is set to 1 in the final word. Subsequently, a word vector and a part-of-speech vector are generated for each candidate word. Finally, the word vector, the part-of-speech vector, the reliability, the confusion set number, and the confusion set end flag are connected and output in the sorting result order.

In step S4, the keyword extraction unit 14 receives the word vector representations of the candidate words from the word vector representation generating unit 13. The keyword extraction unit 14 inputs the received word vector representations to the keyword extraction model stored in the model storage unit 10 in descending order of the reliability. The keyword extraction model outputs a word vector representation (or a word vector representation set) of a word to be extracted as a keyword after all the candidate words included in the confusion set are input. The keyword extraction unit 14 outputs the word vector representation (or the word vector representation set) output by the keyword extraction model as the word vector representation of the keyword to the keyword extraction device 1.

Figure 4:
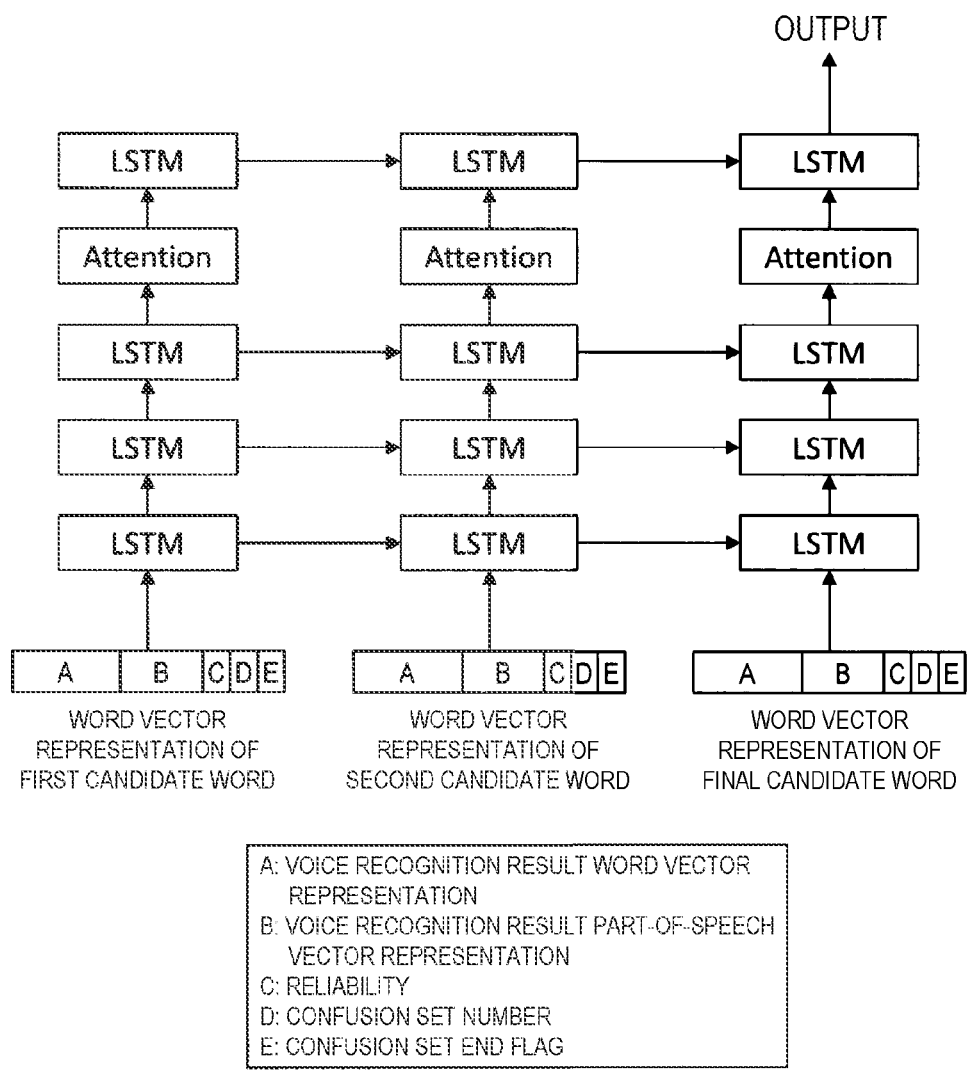
FIG. 4 is a diagram showing processing of a keyword extraction unit.

Processing of the keyword extraction unit 14 will be described in detail with reference to FIG. 4. Here, it is assumed that three candidate words are in a processing target confusion set (see the third confusion set from the left of the confusion network shown in FIG. 3). First, a word vector representation generated from a candidate word (in the example of FIG. 3, "KACHI") with the highest reliability in the confusion set is input to the keyword extraction model. At this time, since the confusion set end flag is 0, the keyword extraction model does not output anything. Then, a word vector representation generated from a candidate word (in the example of FIG. 3, "TACHI") with the second highest reliability in the confusion set is input to the keyword extraction model. At this time, since the confusion set end flag is 0, the keyword extraction model does not output anything. Finally, a word vector representation generated from the candidate word (in the example of FIG. 3, "GA") with the lowest reliability in the confusion set is input to the keyword extraction model. At this time, since the confusion set end flag is 1, the keyword extraction model outputs the word vector representation of a candidate word to be extracted as a keyword. As shown in FIG. 4, when the word vector representations of the candidate words after the second candidate word are input, calculation is executed using an output at the time of inputting of the word vector representation of the immediately previous candidate word in a layer configured by the LSTM.

As described in the above-described embodiment, a set of the candidate words to which the reliability of the voice recognition result is granted at the time of extraction of the keyword in the voice recognition result is used for inputting in the keyword extraction technology of the present invention. Thus, the reliability of the voice recognition can be considered in the extraction of the keyword, and thus robust keyword extraction can be executed from a voice recognition result in which there is an error.

The embodiment of the present invention has been described. A specific configuration is not limited to the embodiment and appropriate changes in the design are, of course, included in the present invention within the scope of the present invention without departing from the gist of the present invention. The various steps of the processing described in the embodiment is executed chronologically in the described order and may also be executed in parallel or individually as necessary or in accordance with a processing capability of the device that performs the processing.

Program and Recording Medium

When various processing functions in the devices described in the foregoing embodiment are realized by a computer, processing content of the functions of the devices are described in accordance with a program. When the computer executes the program, the various processing functions in the devices are realized on the computer.

The program describing the processing content can be recorded on a computer-readable recording medium. As the computer-readable recording medium, for example, any of a magnetic recording device, an optical disc, a magneto-optical recording medium, and a semiconductor memory may be used.

The program is distributed, for example, by selling, delivering, or lending a portable recording medium such as a DVD or a CD-ROM on which the program is recorded. Further, the program may be stored in a storage device of a server computer and the program is transmitted from the server computer to another computer via a network, so that the program is distributed.

For example, a computer executing the program first temporarily stores a program recorded on a portable recording medium or a program transmitted from a server computer in an own storage device. When processing is executed, the computer reads the program stored in the own storage device and executes the processing in accordance with the read program. As another execution form of the program, the computer may directly read a program from a portable recording medium and execute a program in accordance with the program. Further, the computer executes processing in order in accordance with the received program whenever a program is transmitted from a server computer to the computer. The above-described processing may be executed in accordance with an application service provider (ASP) type service that realizes a processing function in accordance with acquisition of an execution instruction and a result without transmitting a program from the server computer to the computer. The program in this form is assumed to include a program which is information provided for processing of a computer and is equivalent to a program (data or the like that has characteristics regulating processing of the computer rather than a direct instruction for a computer).

In this form, the keyword extraction device is configured by executing a predetermined program on a computer. However, at least a part of the processing content may be realized by hardware.

REFERENCE SIGNS LIST

1 Keyword extraction device
10 Model storage unit
11 Speech detection unit
12 Voice recognition unit
13 Word vector representation generating unit
14 Keyword extraction unit

The invention claimed is:

1. A keyword extraction device comprising a processor configured to execute operations comprising:
    storing a keyword extraction model, wherein the keyword extraction model accepts word vector representations of a plurality of words as an input and extracts and outputs a word vector representation of a word to be extracted as a keyword,
    wherein the word vector representation includes:
        a word vector representing the word, a part-of-speech vector representing a part of speech of the word, indication of reliability of voice recognition granted to the word, a number used to uniquely identify a confusion set including the word, and an end flag indicating an end word when words in the confusion set including the word are arranged in descending order of the reliability;

performing voice recognition on an input voice signal and outputting a confusion network, wherein the confusion network includes a voice recognition result of the input voice signal, and the confusion network includes one or more confusion sets;

generating, based on the voice recognition result, a word vector representation of a respective candidate word of candidate words in a respective confusion set in the confusion network, wherein the word vector representation of the respective candidate word includes the respective candidate word in word vector form, an identifier of the respective confusion set, and at least reliability of voice recognition of the respective candidate word included in respective confusion set in the confusion network; and determining the word vector representation of the word as the keyword based on the word vector representation of the respective candidate word included in the respective confusion set as input to the keyword extraction model, wherein the respective candidate word included in the respective confusion set is in a list of the candidate words in descending order of the reliability.

2. The keyword extraction device according to claim 1, wherein the keyword extraction model outputs a vector representing a state in which nothing is output when there is no word to be extracted as the keyword in the word vector representations of a plurality of input words.

3. The keyword extraction device according to claim 1, wherein the keyword extraction model is configured using a recurrent neural network that handles a long-distance context.

4. A keyword extraction method comprising:

storing a keyword extraction model, wherein the keyword extraction model accepts word vector representations of a plurality of words as an input and extracts and outputs a word vector representation of a word to be extracted as a keyword, wherein the word vector representation includes:

a word vector representing the word, a part-of-speech vector representing a part of speech of the word, indication of reliability of voice recognition granted to the word, a number used to uniquely identify a confusion set including the word, and an end flag indicating an end word when words in the confusion set including the word are arranged in descending order of the reliability;

performing voice recognition on an input voice signal and outputting a confusion network, wherein the confusion network includes a voice recognition result of the input voice signal, and the confusion network includes one or more confusion sets;

generating, based on the voice recognition result, a word vector representation of a respective candidate word of candidate words in a respective confusion set in the confusion network, wherein the word vector representation of the respective candidate word includes the respective candidate word in word vector form, an identifier of the respective confusion set, and at least reliability of voice recognition with regard to each candidate word in each confusion set included in the confusion network; and determining the word vector representation of the word as the keyword based on the word vector representation of the respective candidate word included in the respective confusion set as input to the keyword extraction model, wherein the respective candidate word included in the respective confusion set is in a list of the candidate words in descending order of the reliability.

5. A computer-readable non-transitory recording medium storing a computer-executable program instructions that when executed by a processor cause a computer system to execute operations comprising:

storing a keyword extraction model, wherein the keyword extraction model accepts word vector representations of a plurality of words as an input and extracts and outputs a word vector representation of a word to be extracted as a keyword, wherein the word vector representation includes:

a word vector representing the word, a part-of-speech vector representing a part of speech of the word, indication of reliability of voice recognition granted to the word, a number used to uniquely identify a confusion set including the word, and an end flag indicating an end word when words in the confusion set including the word are arranged in descending order of the reliability;

performing voice recognition on an input voice signal and outputting a confusion network, wherein the confusion network includes a voice recognition result of the input voice signal, and the confusion network includes one or more confusion sets;

generating, based on the voice recognition result, a word vector representation of a respective candidate word of candidate words in a respective confusion set in the confusion network, wherein the word vector representation of the respective candidate word includes the respective candidate word in word vector form, an identifier of the respective confusion set, and at least reliability of voice recognition with regard to the respective candidate word included in the respective confusion set in the confusion network; and determining the word vector representation of the word as the keyword based on the word vector representation of the respective candidate word included in the respective confusion set as input to the keyword extraction model, wherein the respective candidate word included in the respective confusion set is in a list of the candidate words in descending order of the reliability.

6. The keyword extraction device according to claim 1, wherein the confusion network includes a compact representation of a list of high-order N sentences of the voice recognition result.

7. The keyword extraction device according to claim 1, wherein the confusion network includes a combination graph for receiving candidate words of the voice recognition result.

8. The keyword extraction device according to claim 1, wherein the word vector representation of the candidate word includes one or more of:

a confusion set number used to uniquely identify a confusion set including the candidate word, or a confusion set end flag indicating a final word when candidate words of the confusion set including the candidate word are arranged in descending order of the reliability.

9. The keyword extraction method according to claim 4, wherein the keyword extraction model outputs a vector representing a state in which nothing is output when there is no word to be extracted as the keyword in the word vector representations of a plurality of input words.

10. The keyword extraction method according to claim 4, wherein the keyword extraction model is configured using a recurrent neural network that handles a long-distance context.

11. The keyword extraction method according to claim 4, wherein the confusion network includes a compact representation of a list of high-order N sentences of the voice recognition result.

12. The keyword extraction method according to claim 4, wherein the confusion network includes a combination graph for receiving candidate words of the voice recognition result.

13. The keyword extraction method according to claim 4, wherein the word vector representation of the candidate word includes one or more of:

a confusion set number used to uniquely identify a confusion set including the candidate word, or a confusion set end flag indicating a final word when candidate words of the confusion set including the candidate word are arranged in descending order of the reliability.

14. The computer-readable non-transitory recording medium according to claim 5, wherein the keyword extraction model outputs a vector representing a state in which nothing is output when there is no word to be extracted as the keyword in the word vector representations of a plurality of input words.

15. The computer-readable non-transitory recording medium according to claim 5, wherein the keyword extraction model is configured using a recurrent neural network that handles a long-distance context.

16. The computer-readable non-transitory recording medium according to claim 5, wherein the confusion network includes a compact representation of a list of high-order N sentences of the voice recognition result.

17. The computer-readable non-transitory recording medium according to claim 5, wherein the word vector representation of the candidate word includes one or more of:

a confusion set number used to uniquely identify a confusion set including the candidate word, or a confusion set end flag indicating a final word when candidate words of the confusion set including the candidate word are arranged in descending order of the reliability.

\* \* \* \* \*